(12) United States Patent
Koide et al.

(10) Patent No.: US 6,781,333 B2
(45) Date of Patent: Aug. 24, 2004

(54) DRIVE CONTROL APPARATUS AND METHOD OF ALTERNATING CURRENT MOTOR

(75) Inventors: Satoshi Koide, Okazaki (JP); Eiji Yamada, Owariasahi (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/143,020

(22) Filed: May 13, 2002

(65) Prior Publication Data

US 2002/0180402 A1 Dec. 5, 2002

(30) Foreign Application Priority Data

May 31, 2001 (JP) ........................................ 2001-163929

(51) Int. Cl.$^7$ ................................................ H02P 7/00
(52) U.S. Cl. .................... 318/432; 318/433; 318/434; 318/802; 318/809; 318/812
(58) Field of Search ................. 318/432–434, 318/727, 798–802, 809, 812

(56) References Cited

U.S. PATENT DOCUMENTS

| 4,023,083 A | * | 5/1977 | Plunkett | 318/227 |
| 5,166,593 A | * | 11/1992 | De Doncker et al. | 318/800 |
| 5,644,206 A | * | 7/1997 | Yura | 318/807 |
| 6,133,700 A | * | 10/2000 | Kumar | 318/85 |

FOREIGN PATENT DOCUMENTS

| JP | A-60237880 | 11/1985 |
| JP | A 6-315293 | 11/1994 |
| JP | A-10032993 | 2/1998 |
| JP | A-200050689 | 2/2000 |
| JP | A-2001028892 | 1/2001 |

* cited by examiner

*Primary Examiner*—Rina Duda
(74) *Attorney, Agent, or Firm*—Oliff & Berridge, PLC

(57) ABSTRACT

A drive control apparatus and method drives an AC motor by applying a rectangular wave voltage thereto. The apparatus estimates the torque of a rotor of the AC motor, and detects a torque deviation which is the difference between the estimated torque and a required torque of the motor. A controller controls a state of the rectangular wave voltage applied to the AC motor, through torque feedback control based on the torque deviation, so that the torque approaches the torque command value. The controller detects a current rotation speed of the motor, and switches, in a predetermined order, a plurality of predetermined rectangular wave voltage states corresponding to different phase values of the rectangular wave voltage. The switching timing of the rectangular wave voltage states is set to a timing that deviates from a reference timing determined based on the current rotation speed, by a length of time corresponding to the torque deviation.

15 Claims, 5 Drawing Sheets

| CURRENT SW PATTERN | [U, V, W] 0: OFF 1: ON | NEXT SW PATTERN | | NEXT SW REFERENCE ANGLE | | INITIAL SW PATTERN DETERMINING ANGLE |
|---|---|---|---|---|---|---|
| | | NORMAL | REVERSE | NORMAL | REVERSE | |
| 1 | [1, 0, 0] | 2 | 6 | +30° | −30° | −30°∼+30° |
| 2 | [1, 1, 0] | 3 | 1 | +90° | +30° | +30°∼+90° |
| 3 | [0, 1, 0] | 4 | 2 | +150° | +90° | +90°∼+150° |
| 4 | [0, 1, 1] | 5 | 3 | +210° | +150° | +150°∼+210° |
| 5 | [0, 0, 1] | 6 | 4 | +270° | +210° | +210°∼+270° |
| 6 | [1, 0, 1] | 1 | 5 | +330° | +270° | +270°∼+330° |
| 70 | 72 | 74 | 76 | 80 | 82 | 78 |

DRIVE CONTROL APPARATUS AND METHOD OF ALTERNATING CURRENT MOTOR

INCORPORATION BY REFERENCE

The disclosure of Japanese Patent Application No. 2001-163929 filed on May 31, 2001, including the specification, drawings and abstract, is incorporated herein by reference in its entirety.

BACKGROUND OF THE INVENTION

1. Field of Invention

The invention relates to a drive control apparatus and method for controlling driving of an alternating current motor (hereinafter simply referred to as "AC motor").

2. Description of Related Art

For driving an AC motor by using a DC power supply, it is widely known to apply a voltage signal of pulse-width modulated (PWM) waveform to the AC motor by using an inverter. However, the PWM waveform voltage is utilized by the AC motor with a relatively low efficiency. Thus, the AC motor to which the PWM waveform voltage is applied cannot produce sufficiently high output or power in a high-speed rotation region.

In view of the above problem, another technology is known in which a voltage signal of rectangular waveform is applied to the AC motor so as to drive/rotate the AC motor. This technology makes it possible to increase power in a high-speed rotation region, and eliminates the need to supply a large amount of field-weakening current to the motor while it is rotating at a high speed, resulting in a reduction in copper loss. Furthermore, the technology makes it possible to reduce the number of times of switching in the inverter, and to thus reduce or suppress switching loss.

Figure 5:
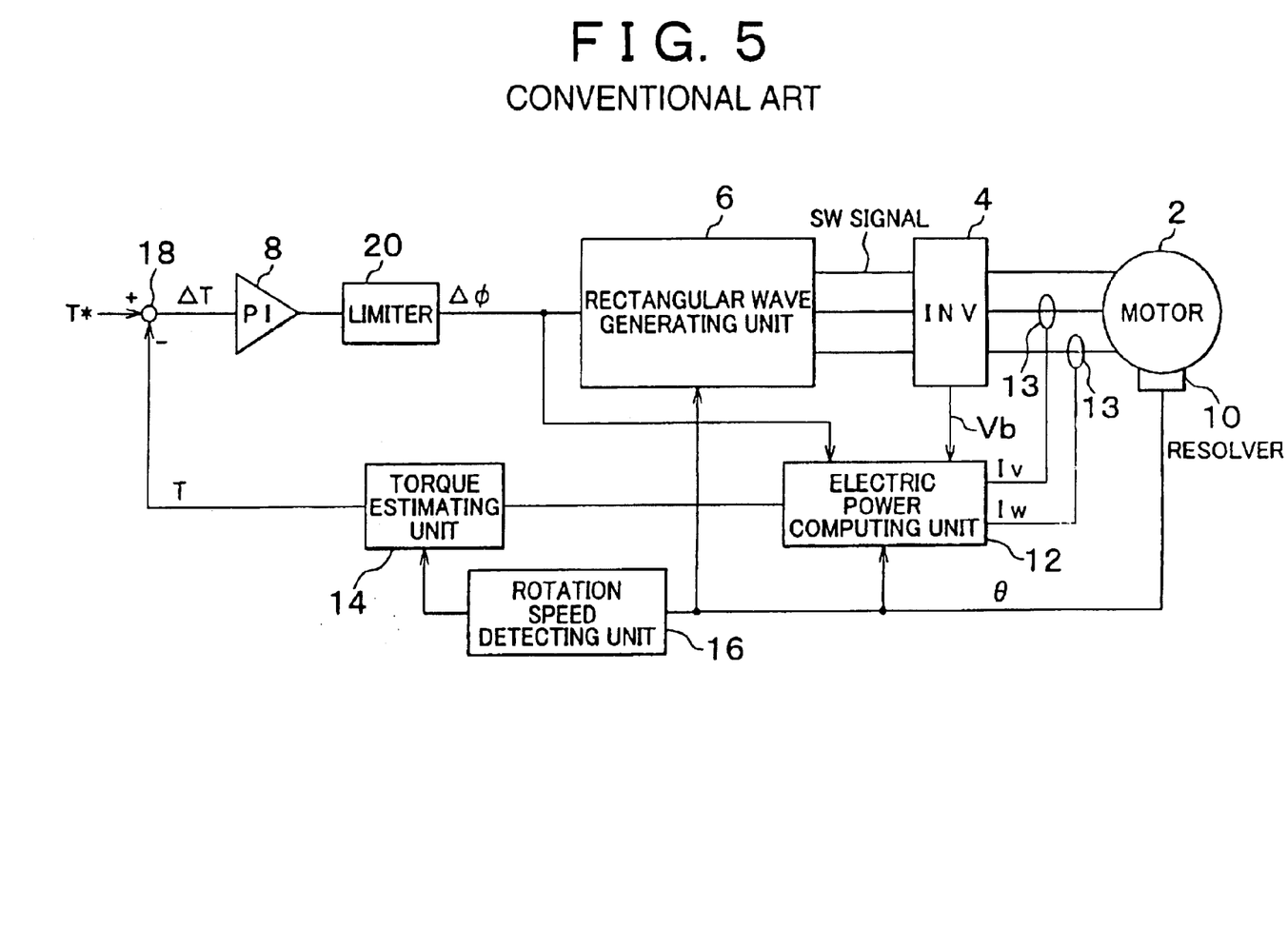
FIG. 5 is a block diagram showing the construction of a known drive control apparatus that drives an AC motor by use of rectangular wave voltage.

FIG. 5 is a block diagram showing the arrangement of a known drive control apparatus that drives an AC motor via a voltage signal of rectangular waveform. The drive control apparatus, which may be used in, for example, electric vehicles, controls the voltage signal applied to the AC motor such that the torque generated by the AC motor corresponds to a torque command value T* produced by an electronic control unit (ECU) (not shown).

A motor 2, which is in the form of a permanent magnet synchronization type AC motor, is connected to an inverter 4. The inverter 4 receives electric power from a battery (not shown), and supplies current to the stator windings of the U, V and W phases of the motor 2. A rectangular wave generating unit 6 is connected to the inverter 4. The rectangular wave generating unit 6 generates a switching (SW) signal for producing rectangular wave voltage with respect to each of the U, V and W phases. On the basis of the SW signals thus supplied, switching operations of the inverter 4 are controlled.

The rectangular wave generating unit 6 controls the phase of each SW signal, based on a voltage phase command $\Delta\phi$ determined by a PI computing unit 8 and a rotor angle $\theta$ that is output from a resolver 10 provided adjacent to the motor 2.

For ease of discussion, a d-q coordinate system (magnetic pole coordinate system), rather than the quantities of the three phases U, V, W of a motor, is used to describe how a motor is controlled. The d-q coordinate system is fixed to a rotor of the motor in question, and voltage equations in a steady state of the motor are expressed in the d-q coordinate system as follows.

$$Vd = R \cdot Id - \omega \cdot Lq \cdot Iq \qquad (1)$$

$$Vq = R \cdot Iq + \omega \cdot Ld \cdot Id + \omega \cdot \psi \qquad (2)$$

In the above equations, Vd and Vq represent a d-axis component and a q-axis component of voltage applied across the stator, and Id and Iq represent a d-axis component and a q-axis component of current passing through the stator, while Ld and Lq represent d-axis inductance and q-axis inductance. Also, $\omega$ represents the angular velocity of the rotor; and $\psi$ represents the flux linkage. The direction of the current vector (Iq, Id) changes in accordance with the direction of the voltage vector (Vq, Vd). The value Iq, which contributes to the torque T of the rotor, also changes in accordance with the direction of the voltage vector.

The voltage phase command $\Delta\phi$ specifies the direction of the voltage vector, and is determined by the PI computing unit 8 so that the Iq provides a desired torque T. Hereinafter, a voltage phase command taken with reference to the d axis (that is, the angle of the voltage vector with respect to the d axis) is expressed as $\Delta\phi$, and a voltage phase command taken with reference to the q axis (that is, the angle of the voltage vector with respect to the q axis) is expressed as $\Delta\phi'$. The voltage phase commands $\Delta\phi$, $\Delta\phi'$ have the following relationship (3):

$$\Delta\phi = \Delta\phi' + 90° \qquad (3)$$

When $\Delta\phi'$ is equal to 0°, the torque T is equal to 0. When $\Delta\phi'$ is equal to +90°, a maximum positive torque can be obtained. When $\Delta\phi'$ is equal to −90°, a maximum negative torque can be obtained.

In the d-q coordinate system, a desired torque T can be related to or associated with the voltage phase command $\Delta\phi$ (or $\Delta\phi'$). However, motor control is actually based on the quantities of the three phases U, V, W of the motor. Specifically, the phases of current supplied from the inverter 4 to the windings of the U, V and W phases of the motor 2 change depending on the rotor angle $\theta$ and the voltage phase command $\Delta\phi$. More specifically, the current of each phase is a function of the sum ($\xi$) of $\Delta\phi$ and $\theta'$, where $\theta'$ represents an electrical angle that is associated with a mechanical rotational angle $\theta$ of the rotor. Since the quantities of the three phases change in accordance with the rotor angle $\theta$, the rectangular wave generating unit 6 receives information regarding the rotor angle $\theta$ from the resolver 10, and controls the phases of the SW signals corresponding to the three phases of the motor as described above.

Further, the torque T which is currently being produced by the motor is estimated based on the electric power supplied to the motor 2. An electric power computing unit 12 calculates the electric power supplied to the motor 2 based on the winding currents Iv, Iw of the V and W phases, which are obtained from respective current sensors 13, the rotor angle $\theta$, which is obtained from the resolver 10, and the voltage phase command $\Delta\phi$. The U, V and W phases shift 120° in phase from one another, therefore, the total sum of the currents Iu, Iv, Iw of the three phases is equal to zero in principle. Thus, the current sensors 13 are provided only for two phases (V and W phases in this embodiment), and the electric power computing unit 12 calculates the current value of the remaining phase (the U phase), based on the current values of the two phases measured by the sensors 13. The currents of the three phases can be expressed as follows, where I represents the amplitude of current.

$$Iu = I \cdot \sin(\xi + 90°) \qquad (4)$$

$$Iv = I \cdot \sin(\xi + 90° - 120°) \qquad (5)$$

$$Iw = I \cdot \sin(\xi + 90° + 120°) \qquad (6)$$

The electric power computing unit 12 determines $\xi$ from $\Delta\phi$ and $\theta$. Here, the inverter 4 is supposed to generate rectangular waves that switch between a voltage level of $-Vb/2$ and a voltage level of $Vb/2$. The value Vb is transmitted from the inverter 4 to the electric power computing unit 12. The electric power computing unit 12 calculates voltage fundamental waves Vu, Vv, Vw contained in the rectangular wave voltages of the respective three phases, according to the following equations (7), (8) and (9).

$$Vu=(Vb/2)(4/\pi)\cdot\sin(\xi+90°) \quad (7)$$

$$Vv=(Vb/2)(4/\pi)\cdot\sin(\xi+90°-120°) \quad (8)$$

$$Vw=(Vb/2)(4/\pi)\cdot\sin(\xi+90°+120°) \quad (9)$$

Then, the electric power computing unit 12 calculates an estimated power P based on the following equation (10).

$$P=Vu\cdot Iu+Vv\cdot Iv+Vw\cdot Iw \quad (10)$$

A torque estimating unit 14 determines an estimated value of current torque T from the estimated power P determined by the electric power computing unit 12, and the speed N of rotation of the motor 2, according to the following equation (11).

$$T=keff\cdot P/\omega \quad (11)$$

In the above equation, keff is a correction factor of the efficiency of conversion for electric power to torque. The angular velocity $\omega$ is calculated from the rotation speed N of the motor 2. The rotation speed N is detected by a rotation speed detecting unit 16. The rotation speed detecting unit 16 detects the rotation speed N based on changes in the rotor angle $\theta$ (output from the resolver 10) over time.

The estimated torque T is input to an adder 18. The adder 18 determines a torque deviation $\Delta T$ according to the following equation (12) based on the torque command value T* and the estimated torque T. Then, the PI computing unit 8 performs torque feedback control so as to converge the torque deviation $\Delta T$ to zero through PI control. Thus, the PI computing unit 8 determines the voltage phase command $\Delta\phi'$ (or $\Delta\phi$).

$$\Delta T=T^*-T \quad (12)$$

Figure 6:
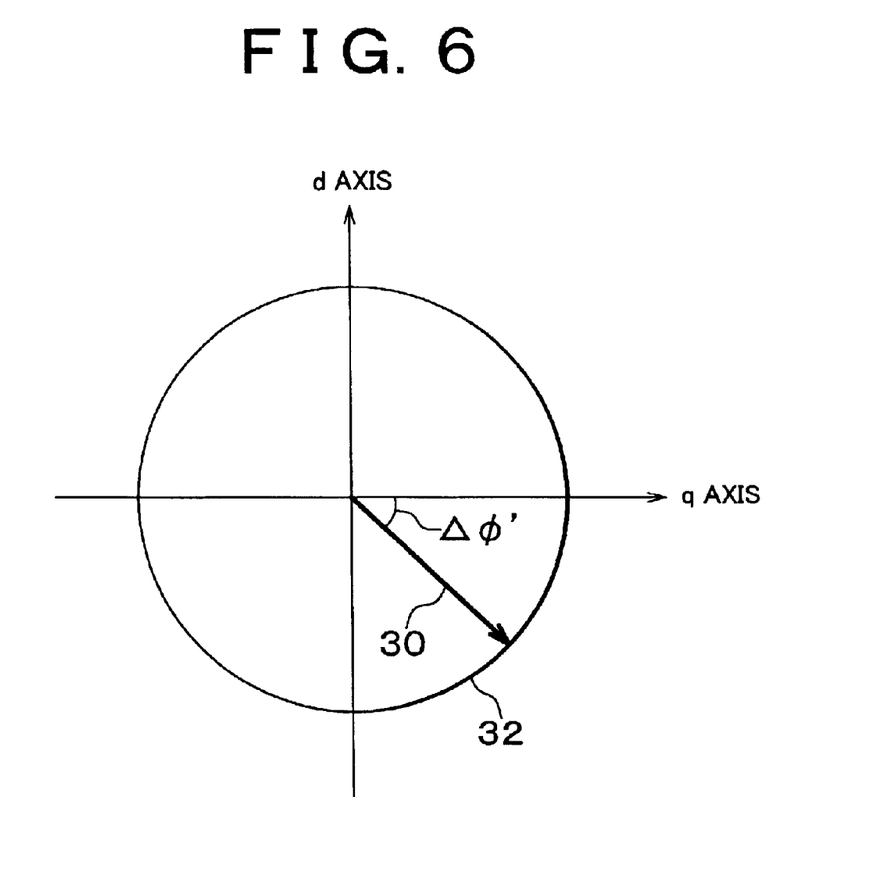
FIG. 6 is a diagram illustrating a voltage vector.

FIG. 6 is a diagram indicating an example of a voltage vector. An end point of a voltage vector 30 (having a length of Av) moves along a circle 32 in accordance with the value of the voltage phase command $\Delta\phi'$. Here, the voltage phase command $\Delta\phi'$ takes a positive value when it moves in the clockwise direction as viewed in FIG. 6.

Further, the winding wire resistance R of the motor 2 is normally small, and therefore the above-indicated equations (1) and (2) can be approximated to simpler ones by ignoring the terms that include R. Furthermore, the following equations (13) and (14) are obtained from the diagram of FIG. 6.

$$Vd=-Av\cdot\cos\Delta\phi' \quad (13)$$

$$Vq=Av\cdot\sin\Delta\phi' \quad (14)$$

Accordingly, the following equations can be obtained from the equations (1) and (2).

$$Id=(Av\cdot\sin\Delta\phi'-\omega\cdot\psi)/(\omega\cdot Ld) \quad (15)$$

$$Iq=Av\cdot\cos\Delta\phi'/(\omega\cdot Lq) \quad (16)$$

The component Iq of the current vector contributes to the torque T. As the component Iq increases, the torque T produced increases. From the equation (16), it is understood that the torque monotonously increases as the voltage phase command $\Delta\phi'$ varies from $-90°$ to $+90°$, and that the maximum positive torque is produced when $\Delta\phi'$ is approximately equal to $90°$, while the maximum negative torque is produced when $\Delta\phi'$ is approximately equal to $-90°$. If $\Delta\phi'$ exceeds either one of the limit values $90°$, $-90°$, the absolute value of the torque produced decreases. Therefore, if the voltage phase command $\Delta\phi'$ is allowed to exceed $\pm90°$, the torque feedback control may not be accomplished, namely, the torque deviation $\Delta T$ may fail to be equal to zero. A limiter 20 is provided for preventing this possibility. That is, if the voltage phase command $\Delta\phi'$ output from the PI computing unit 8 exceeds $\pm90°$, the limiter 20 clips the excessive value, so that control operations at later stages, including the rectangular wave generating unit 6 and others, will be performed with the voltage phase command $\Delta\phi'$ held in the range of $-90°\leq\Delta\phi'\leq90°$.

As described above, the known drive control apparatus for driving an AC motor by using a voltage signal of rectangular waveform includes rotor angle detecting means, such as the resolver, and uses the detected rotor angle $\theta$ for driving control. Namely, since the known apparatus structurally requires a rotor position sensor, the construction of the apparatus is likely to be complicated, resulting in an increased cost. If no rotor position sensor is provided, the known drive control apparatus becomes unable to perform control using a voltage signal of rectangular waveform.

SUMMARY OF THE INVENTION

It is one object of the invention to provide a drive control apparatus that permits control of a voltage signal of rectangular waveform to be applied to an AC motor, without requiring detection of the position of a rotor of the motor.

To accomplish the above and/or other object(s), there is provided according to one aspect of the invention a drive control apparatus for driving an AC motor by applying a rectangular wave voltage thereto, which includes: (a) a torque estimating unit that obtains an estimated torque of a rotor of the AC motor, (b) a torque deviation detecting unit that detects a torque deviation as a difference between the estimated torque and a torque command value representing a required torque of the AC motor, and (c) a rectangular wave voltage controller that controls a state of the rectangular wave voltage applied to the AC motor, through torque feedback control based on the torque deviation, so that a torque of the rotor approaches the torque command value. In the apparatus, the rectangular wave voltage controller detects a current rotation speed of the AC motor, and switches, in a predetermined order, a plurality of predetermined rectangular wave voltage states corresponding to different phase values of the rectangular wave voltage. Accordingly, the switching timing of the rectangular wave voltage states is set to a timing that deviates, from a reference timing determined based on the current rotation speed, by a length of time corresponding to the torque deviation.

When the torque deviation is equal to zero, switching of the rectangular wave voltage states is effected in the reference timing. When the torque deviation is not equal to zero, on the other hand, the switching timing is shifted from the reference timing by the length of time corresponding to the torque deviation. In this embodiment, the rectangular wave voltage states respectively correspond to mutually different phase values, namely, voltage vectors having mutually different directions. When the torque deviation is equal to zero, which means that the estimated torque coincides with the torque command value, the electrical angle formed between the rotor and the voltage vector of the rectangular wave voltage applied to the stator windings of the AC motor is equal to a constant value corresponding to the torque command value. In this case, an angular change in the electrical angle of the rotor is, in principle, equal to an angular change in the voltage vector of the rectangular wave voltage. In the meantime, an angular change in the electrical angle of the rotor is related or associated with a change in the mechanical angle of the rotor, and the time required for the change in the mechanical angle is determined depending upon the rotation speed of the AC motor. Further, an angular change of the voltage vector between one of the plural rectangular wave voltage states and the next rectangular wave voltage state is known. Accordingly, when the torque deviation is equal to zero, the time between the beginning of the certain rectangular wave voltage state and that of the next rectangular voltage state is determined depending upon the rotation speed of the AC motor. Therefore, the reference timing, discussed above, is determined based upon the current rotation speed of the AC motor. If the switching timing of the rectangular wave voltage states is shifted from the reference timing, the electric angle formed between the rotor and the voltage vector of the rectangular wave voltage applied to the stator windings of the AC motor changes, resulting in a change in the torque generated at the rotor. By controlling an amount by which the switching timing is shifted from the reference timing according to the torque deviation, the torque feedback control can be accomplished without knowing or acquiring the rotating position of the rotor.

In a preferred embodiment of the invention, the switching timing controller determines an amount of rotation of the rotor during the current rectangular wave voltage state, according to the torque deviation, and calculates a time duration between switching to the current rectangular wave voltage state and switching to the next rectangular wave voltage state, based on a ratio of the amount of rotation of the rotor to the rotation speed.

As discussed above, when the torque deviation is equal to zero, the amount of rotation of the rotor during the current rectangular wave voltage state is determined depending upon a difference between the phase values of the current rectangular wave voltage state and the next rectangular wave voltage state. When the torque deviation is not equal to zero, the switching timing controller increases or reduces the amount of rotation of the rotor obtained in the case where the torque deviation is equal to zero, depending upon the torque deviation. By dividing an angle of rotation thus obtained by the current angular velocity of the AC motor, the controller determines a time duration between the beginning of the current rectangular wave voltage state and the beginning of the next rectangular wave voltage state.

According to another aspect of the invention, there is provided a drive control apparatus for driving an AC motor by applying a rectangular wave voltage thereto, which includes (a) an electric power estimating unit that obtains an estimated electric power of the AC motor based on a command value of the rectangular wave voltage applied to the AC motor, (b) a torque estimating unit that obtains an estimated torque of a rotor of the AC motor, based on the estimated electric power, (c) a torque deviation detecting unit that detects a torque deviation as a difference between the estimated torque and a torque command value representing a required torque of the AC motor, and (d) a rectangular wave voltage controller that controls a state of the rectangular wave voltage applied to the AC motor, through torque feedback control based on the torque deviation, so that a torque of the rotor approaches the torque command value.

As shown in equation (11) above, the value of the current torque which is needed for torque feedback control can be estimated from the electric power consumed by the AC motor. According to the above aspect of the invention, the estimated electric power of the AC motor is obtained using a command voltage value of rectangular wave voltage, instead of voltage fundamental waves calculated based on the position of rotation of the rotor. Thus, the electric power can be estimated without knowing the rotational position of the rotor, and the torque can be estimated based on the estimated electric power.

According to a further aspect of the invention, there is provided a drive control apparatus for driving an AC motor by applying a rectangular wave voltage thereto, which includes: (a) a rectangular wave voltage controller that switches, in a predetermined order, a plurality of predetermined rectangular wave voltage states corresponding to different phase values of the rectangular wave voltage, and (b) a rotating speed estimating unit that estimates a rotation speed of the AC motor, based on a time duration between switching to one of the rectangular wave voltage states and switching to the next rectangular wave voltage state, and a difference in the phase value between the switching rectangular wave voltage states.

In the drive control apparatus capable of performing torque feedback control as described above, when the torque deviation is equal to zero, a difference in the phase value between the rectangular wave voltage states, namely, an angular change in the voltage vector, is equal to an angular change in the electrical angle of the rotor, which can be converted into a mechanical angular change of the rotor. In this case, the mechanical rotational angle of the rotor within the time duration or interval of switching of the rectangular wave voltage states is obtained from a difference in the phase value between the rectangular wave voltage states, and the rotating speed of the AC motor is determined by dividing the mechanical rotational angle of the rotor by the switching interval of the rectangular wave voltage states. When the torque deviation is not equal to zero, the switching timing of the rectangular wave voltage states is shifted, therefore, an angular change in the voltage vector between the rectangular wave voltage states is not equal to an angular change in the electrical angle of the rotor. In this case, the rotational speed may be obtained in view of the degree by which the switching timing is shifted, or an approximate rotational speed may be obtained without considering the shifted timing. Thus, the rotating speed of the AC motor used for torque feedback control or calculation of the estimated torque can be estimated without detecting the rotational position of the rotor.

According to a still another aspect of the invention, there is provided a drive control apparatus for driving an AC motor by applying a rectangular wave voltage thereto, which comprises: (a) a torque estimating unit that obtains an estimated torque of a rotor of the AC motor, (b) a torque deviation detecting unit that detects a torque deviation as a difference between the estimated torque and a torque command value representing a required torque of the AC motor, (c) a rectangular wave voltage controller that controls a state of the rectangular wave voltage applied to the AC motor, through torque feedback control based on the torque deviation, so that a torque of the rotor approaches the torque command value, and (d) a torque command value limiter that limits the torque command value within a range that permits the torque feedback control to bring the torque of the rotor close to the torque command value.

The torque generated by the rotor changes depending upon an angle formed between the electrical angle position of the rotor and the voltage vector of the rectangular wave voltage state applied to the stator windings. When the angle is approximately equal to 90°, the maximum torque is produced. On the other hand, if the angle exceeds the upper limit of 90°, the torque is reduced, and the torque deviation is not converged to zero through torque feedback control. According to the above aspect of the invention, the torque command value is limited or restricted so as not to produce a torque deviation corresponding to an angular range that exceeds the upper limit.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein.

DETAILED DESCRIPTION OF PREFERRED EMBODIMENTS

Figure 1:
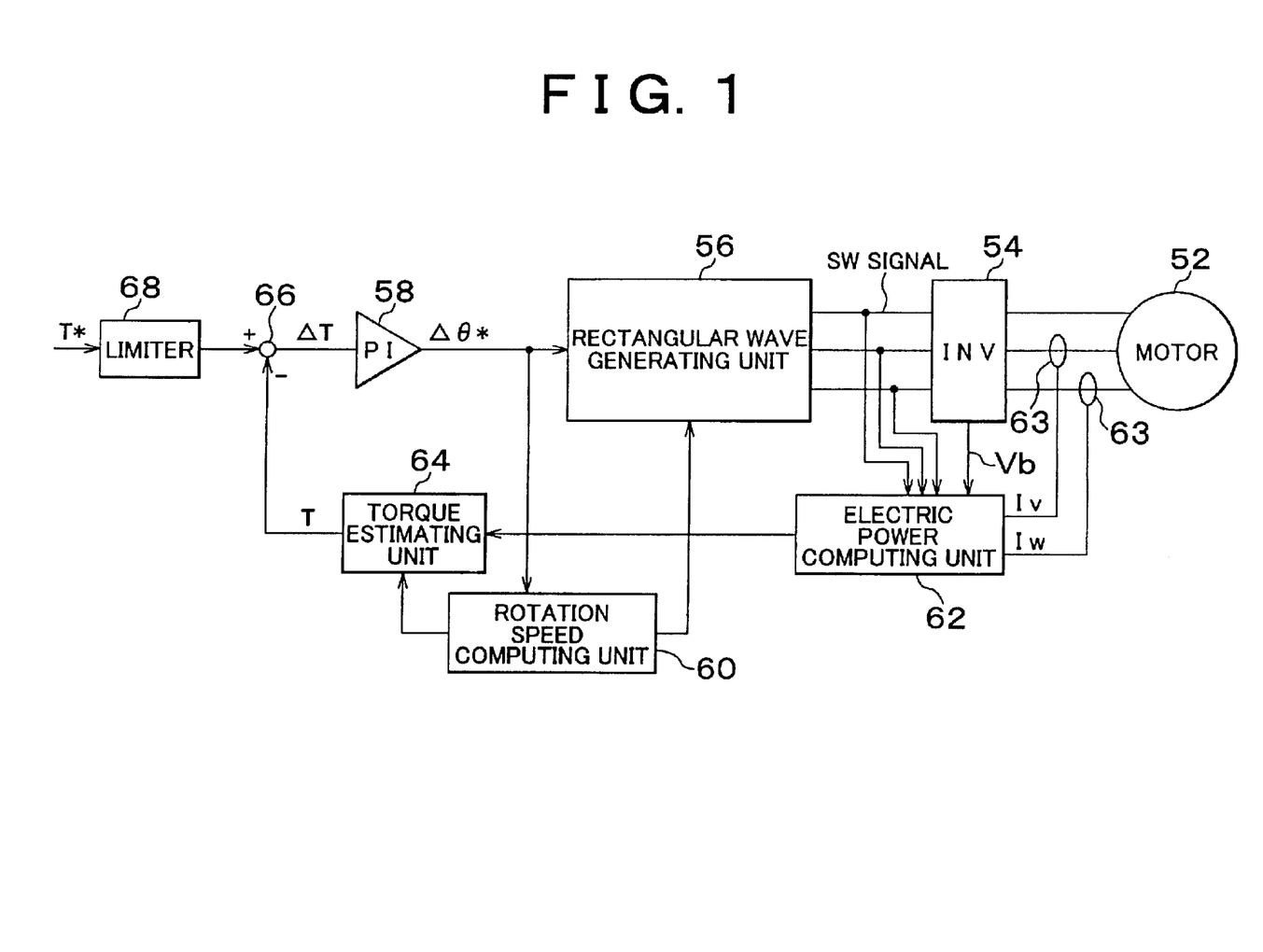
FIG. 1 is a block diagram of a drive control apparatus for driving an AC motor by use of rectangular wave voltage in accordance with an exemplary embodiment of the invention.

FIG. 1 illustrates a drive control apparatus for driving an AC motor by using rectangular wave voltage in accordance with an exemplary embodiment of the invention. The drive control apparatus may be used in, for example, electric vehicles. Also, the apparatus is capable of using a PWM waveform, a rectangular waveform, as well as other voltage waveforms to control the AC motor. The apparatus controls the AC motor such that the AC motor outputs a torque with a value corresponding to a torque command value T* generated by an ECU (not shown). The drive control apparatus, which is capable of performing both the PWM control and the rectangular wave voltage control, performs the PWM control while the speed of rotation of the motor is in a relatively low range, and performs the rectangular wave voltage control while the speed of rotation of the motor is in a relatively high range, so as to achieve favorable running of the vehicle. The apparatus may include a structure or arrangement associated with the PWM control in addition to a structure associated with the rectangular wave voltage control as shown in FIG. 1, or may functionally utilize the structure as shown in FIG. 1 so as to perform the PWM control. However, the structure associated with the PWM control is not essential to the invention, and therefore is not illustrated in the drawings.

An inverter 54 is connected to an electric motor 52 that is in the form of a permanent magnet synchronization type alternating current motor. The inverter 54 receives power from a battery (not shown), and supplies current to the stator windings of the U, V and W phases of the motor 52. A rectangular wave generating unit 56 is connected to the inverter 54. The rectangular wave generating unit 56 generates a switching (SW) signal for producing rectangular wave voltage with respect to each phase of the motor 52. On the basis of the SW signals, switching of the inverter 54 is controlled.

The rectangular wave generating unit 56 controls the phase of the SW signals based on a controlled variable $\Delta\theta^*$ received from a PI computing unit 58 and a rotation speed (angular velocity) $\omega$ of the motor 52 estimated by a rotation speed computing unit 60.

Figure 2:
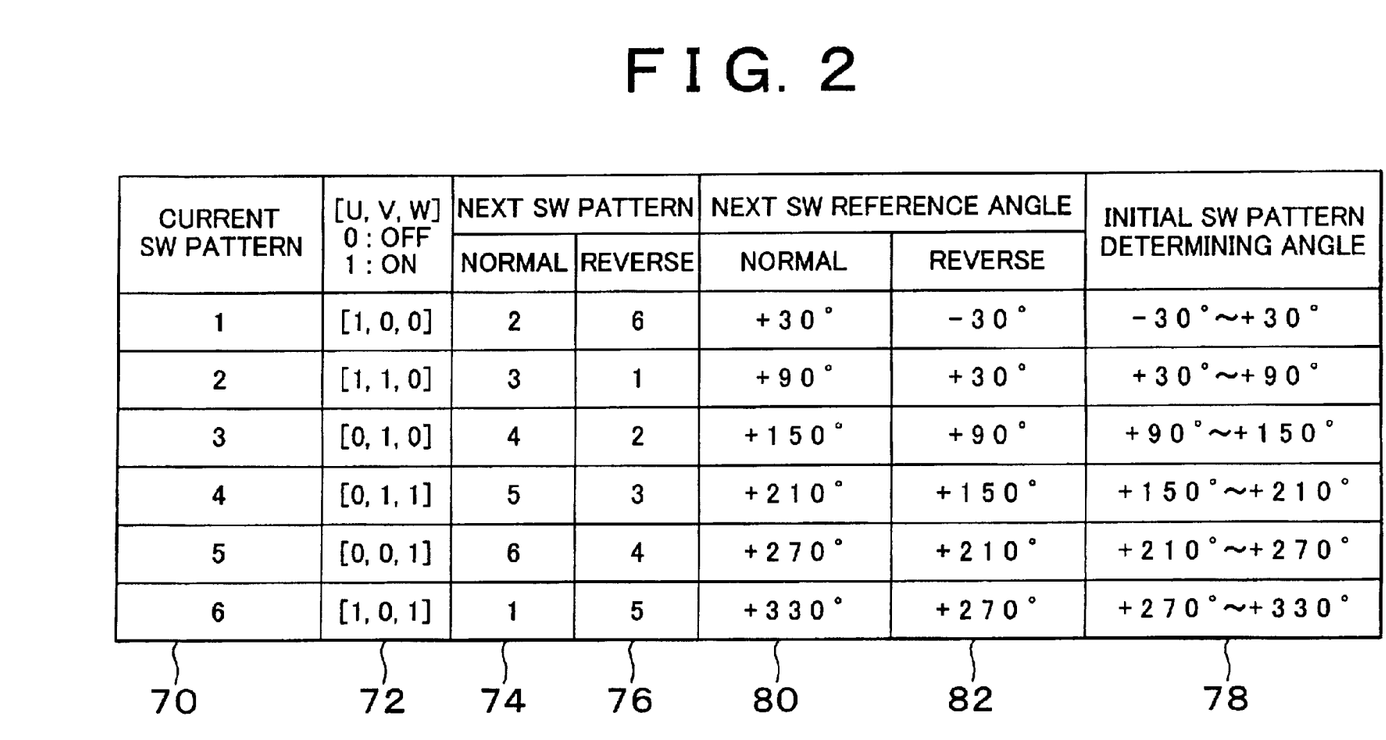
FIG. 2 is a table showing six switching patterns of a rectangular wave voltage control and corresponding control information.

Of the ON/OFF combinations of the SW signals corresponding to the U, V and W-phase windings, six combinations in which only one or two of the three SW signals are ON are used to control the rotation of the electric motor 52. FIG. 2 is a table showing the six switching patterns (SW patterns) and control information corresponding to the six patterns. The content of the table will be described below. In FIG. 2, column 70 shows the serial number of a SW pattern that is established at a certain point of time, and column 72 shows a corresponding set of the ON/OFF states of the U, V and W-phase signals in the form of [Fu, Fv, Fw], where Fu, Fv, Fw represent the ON/OFF states of the signals U, V, W. In the table of FIG. 2, the ON state is represented by value "1", and the OFF state is represented by value "0".

One cycle or round of electrical angle is equally divided into six ranges of −30° to +30°, +30° to +90°, +90° to +150°, +150° to +210°, +210° to +270°, and +270° to +330°. Typical voltage vectors of these ranges are generated by the SW patterns 1 to 6. For example, a voltage vector directed at an electrical angle of 0°, which is the center of the range of −30° to +30°, is generated by the SW pattern 1. Likewise, voltage vectors directed at electrical angles of 60°, 120°, 180°, 240° and 300° are generated by the SW patterns 2, 3, 4, 5 and 6, respectively. The rectangular wave generating unit 56 sequentially changes one of the voltage vectors discretely oriented in one of the six directions to another direction in suitable time, in order to control the phases of the three-phase rectangular wave voltage supplied from the inverter 54 to the motor 52.

The command value $\Delta\theta^*$ generated by the PI computing unit 58 specifies a rotational angle of the rotor during a period from the start of the current SW pattern to the end thereof (namely, until the current SW pattern is switched to the next SW pattern). Namely, the rectangular wave generating unit 56 switches from the current SW pattern to the next SW pattern at a point of time at which the rotor turns by the angle $\Delta\theta^*$. The switching orders of the SW patterns during normal (or positive) rotation of the motor 52 and during reverse rotation thereof are respectively indicated in columns 74, 76 in FIG. 2. During the normal rotation of the motor 52, the switching order is an ascending order of the phase value of the rectangular wave voltage (or the deflection angle of the voltage vector), more specifically, " . . . →1→2→3→4→5→6→1→ . . . " where the serial numbers of the SW patterns are used. During the reverse rotation of the motor 52, the switching order is a descending order of the phase value of the rectangular wave voltage, more specifically, " . . . →6→5→4→3→2→1→6→ . . . " where the serial numbers of the SW patterns are used.

The PI computing unit 58 determines the command value $\Delta\theta^*$ so that a desired torque T can be produced. The torque T currently being produced by the motor is estimated based on the electric power supplied to the motor 52. An electric power computing unit 62 is provided for determining the electric power supplied to the motor 52. The electric power computing unit 62 calculates electric power by using winding currents Iv, Iw of the V and W phases, which are obtained from current sensors 63, the SW signals from the rectangular wave generating unit 56, and a parameter Vb indicative of the voltage level of the rectangular wave generated by the inverter 54. In this embodiment, the inverter 54 is supposed to generate a rectangular wave whose voltage level switches or alternately changes between (−Vb/2) and (Vb/2).

Based on the principle that the total sum of the currents Iu, Iv and Iw is equal to zero, the electric power computing unit 62 calculates a current value Iu from the measured current values Iv and Iw. The currents Iu, Iv, Iw are expressed as in the above-indicated equations (4) to (6). The electric power computing unit 62 estimates electric power by using an instantaneous voltage value (or command voltage value) output from the inverter 54, instead of the fundamental waves of rectangular wave voltage as expressed by the above-indicated equations (7) to (9). Therefore, the electric power is estimated without requiring detection of the rotational angle of the rotor. The estimation of the electric power is described below.

For example, in the SW pattern 2 associated with an electrical angle $\xi=+30°$ to $+90°$, the instantaneous voltage values Vu*, Vv*, Vw* of rectangular wave voltage are expressed as follows:

$$Vu^*=Vb/2 \tag{17}$$

$$Vv^*=Vb/2 \tag{18}$$

$$Vw^*=-Vb/2 \tag{19}$$

P' is defined as in the following equation (20):

$$P'=Vu^* \cdot Iu + Vv^* \cdot Iv + Vw^* \cdot Iw \tag{20}$$

With respect to the SW pattern 2, the equation (20) can be rewritten into the following equation (21), using the above-indicated equations (4) to (6) and (17) to (19).

$$P'=Vb \cdot I \cdot \sin(\xi+30°) \tag{21}$$

If the calculations similar to the above-described calculations are performed on the other SW patterns, the following results with respect to the whole range of the electrical angles are obtained.

$$P'=Vb \cdot I \cdot \sin(\xi+90°), \text{ where } \xi=-30° \text{ to } +30°$$

$$P'=Vb \cdot I \cdot \sin(\xi+30°), \text{ where } \xi=+30° \text{ to } +90°$$

$$P'=Vb \cdot I \cdot \sin(\xi-30°), \text{ where } \xi=+90° \text{ to } +150°$$

$$P'=Vb \cdot I \cdot \sin(\xi-90°), \text{ where } \xi=+150° \text{ to } +210°$$

$$P'=Vb \cdot I \cdot \sin(\xi-150°), \text{ where } \xi=+210° \text{ to } +270°$$

$$P'=Vb \cdot I \cdot \sin(\xi-210°), \text{ where } \xi=+270° \text{ to } +330°$$

From the above equations, it is understood that the waveform of angular changes of P' is formed by repeating a bowl-shaped waveform having a period of $\pi/3$. The average <P'> of P' in each angle range of $\xi$ is given by the following equation (22).

$$<P'>=(3/\pi) \cdot Vb \cdot I \tag{22}$$

In the meantime, the estimated electric power P calculated by the electric power computing unit 12 of the known drive control apparatus as discussed above can be expressed by the following equation (23), which is obtained by substituting the equations (4) to (9) in the equation (10).

$$P=(3/\pi) \cdot Vb \cdot I \tag{23}$$

Accordingly, the estimated electric power P determined by the electric power computing unit 12 is constant irrespective of the electrical angle $\xi$. Further, the average <P> with respect to any angle range is equal to the value of P. Thus, the following equation (24) is obtained.

$$<P>=(3/\pi) \cdot Vb \cdot I \tag{24}$$

By comparing the equation (24) with equation (22), it will be understood that the average <P'> with respect to an angle range corresponding to a SW pattern is an average estimated electric power in the angle range. Therefore, the electric power computing unit 62 calculates the value <P'>, and outputs the value as an estimated electric power corresponding to each of the SW patterns.

A torque estimating unit 64 determines an estimated value of current torque T of the motor from the estimated electric power <P'> determined by the electric power computing unit 62 and the rotation speed N of the motor 52, according to the following equation which corresponds to equation (11).

$$T=keff \cdot <P'>/\omega \tag{25}$$

where keff is a correction factor of the efficiency of conversion from electric power to torque, and $\omega$ is calculated from the rotation speed N of the electric motor 52.

The rotation speed N is detected by the rotation speed computing unit 60. The rotation speed computing unit 60 calculates the value of the angular velocity $\omega$ by dividing the rotational angle $\Delta\theta$ of the rotor during a period from the beginning of the previous SW pattern to the beginning of the current SW pattern, by the length of the period. It is possible to use the command value $\Delta\theta^*$ generated by the PI computing unit 58 and used in the previous SW pattern as the rotational angle $\Delta\theta$. It is also possible to use an approximate value, which is approximately equal to 60°, as the rotational angle $\Delta\theta$. In addition, the estimated angular velocity $\omega$, which is determined based on the information associated with the previous SW pattern, is used as an approximate value of the angular velocity in the current SW pattern.

The estimated torque T is transmitted to an adder 66. The adder 66 determines a torque deviation $\Delta T$ according to equation (12), based on the torque command value T* and the estimated torque T. The PI computing unit 58 then performs torque feedback control to converge the torque deviation $\Delta T$ to zero through PI control according to the following equation (26). In this manner, the command value $\Delta\theta^*$ is determined.

$$\Delta\theta^*=kp \cdot \Delta T + \Sigma ki \cdot \Delta T \tag{26}$$

where kp and ki are coefficients of proportional control and integral control, respectively, and $\Sigma$ indicates the accumulation or sum of results obtained in the past control.

The processing or operation of the rectangular wave generating unit 56 will be described with the following example. This apparatus performs rectangular wave voltage control while the motor rotates in a high-speed region, and performs PWM control while the motor rotates in a low-speed region. The initial switching control performed at the time of change from the PWM control to the rectangular wave voltage control will first be described, and then the second and subsequent SW controls will be described.

(1) Control Upon Initial Switching

At the time of initial switching from the PWM control to the rectangular wave voltage control, a final value θ1 of the electrical angle of the rotor reached at the end of the PWM control, a final value Δϕ1 of the voltage phase command, and a final value ω1 of the rotation speed (angular velocity) of the rotor can be used. The direction of rotation of the rotor remains unchanged, therefore, the direction of rotation is the same as that during the PWM control. The rectangular wave generating unit 56 determines an angle ξ1 for determining the initial SW pattern by using the following equation (27):

$$\xi 1 = \theta 1 + \Delta \phi 1 \tag{27}$$

Figure 3:
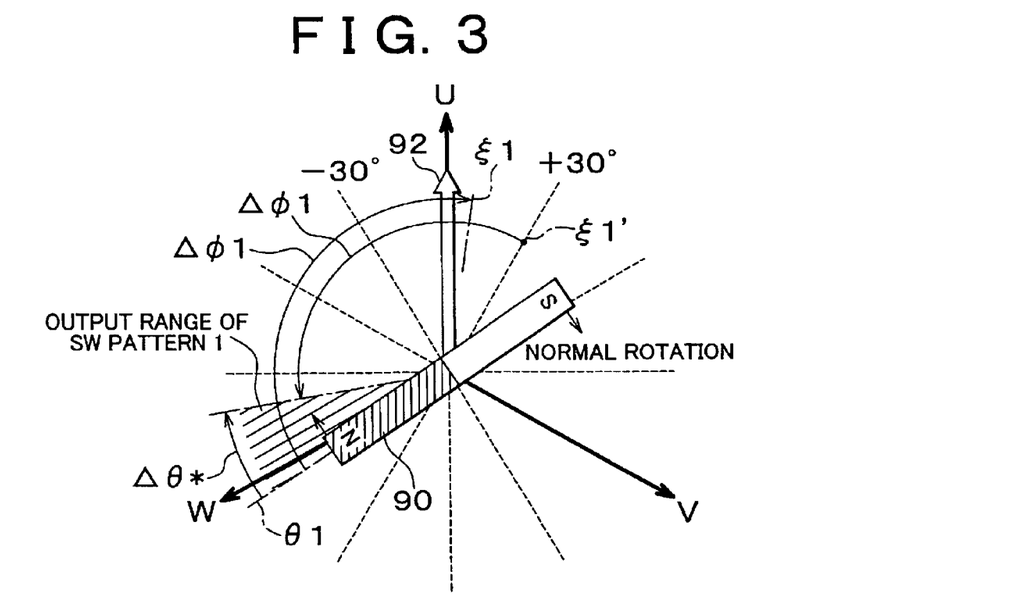
FIG. 3 is a schematic diagram illustrating an exemplary position of a rotor at a point in time when the drive control apparatus switches from PWM control to rectangular wave voltage control.

FIG. 3 is a schematic diagram illustrating an exemplary position of the rotor at the time of change from the PWM control to the rectangular wave voltage control. In this example, ξ1 is located within the range of −30° to +30°, which as discussed above, corresponds to the SW pattern 1. The rectangular wave generating unit 56 stores information regarding the range of the initial SW pattern determining angle ξ1 corresponding to each SW pattern, in association with the current SW pattern, as indicated in column 78 in FIG. 2. On the basis of the table of FIG. 2, the rectangular wave generating unit 56 determines that the current SW pattern is the SW pattern 1. The current SW pattern is an SW pattern that generates a voltage vector 92 that applies a currently required torque to the rotor 90.

If the AC motor 52 is rotating in the normal direction, the next SW pattern will be the SW pattern 2 as shown in FIG. 2. The next SW reference angle, that is, the electrical angle at the time of change from the current SW pattern to the next SW pattern, is +30°, which is the boundary between these two SW patterns. The rectangular wave generating unit 56 stores the next SW reference angles ξ1' for each current SW pattern. These angles differ depending upon whether the AC motor 52 is rotating in the normal direction or in the reverse direction, as shown in columns 80 and 82 in FIG. 2. On the basis of the table of FIG. 2, the rectangular wave generating unit 56 acquires 30° as the next SW reference angle in the case where the current SW pattern is the SW pattern 1.

The command value Δθ* of rotational angle of the rotor up to the time of the switch from the current SW pattern to the next SW pattern is given by the following equation (28):

$$\Delta \theta ^* = \xi 1' - \xi 1 \tag{28}$$

The rectangular wave generating unit 56 has a counter that operates in accordance with a control clock having a predetermined cycle τ (e.g., 400 n sec.). Using the angular velocity ω1 provided by the PWM control, the rectangular wave generating unit 56 calculates a count value N* of the counter corresponding to the time required for the rotor to rotate by the angle Δθ*, based on the following equation (29), and sets the obtained value in the counter.

$$N^* = \Delta \theta ^* / (\omega \cdot \tau) \tag{29}$$

The rectangular wave generating unit 56 performs the above-described operations at the time of a change from the PWM control to the rectangular wave voltage control, and generates a SW signal corresponding to the current SW pattern to the inverter 54, while at the same time starting the counter. The rectangular wave generating unit 56 then proceeds to the operation of switching to the next SW pattern when the count value of the counter reaches the upper limit value N* set as described above.

(2) Control Upon Second and Subsequent Switching

Figure 4:
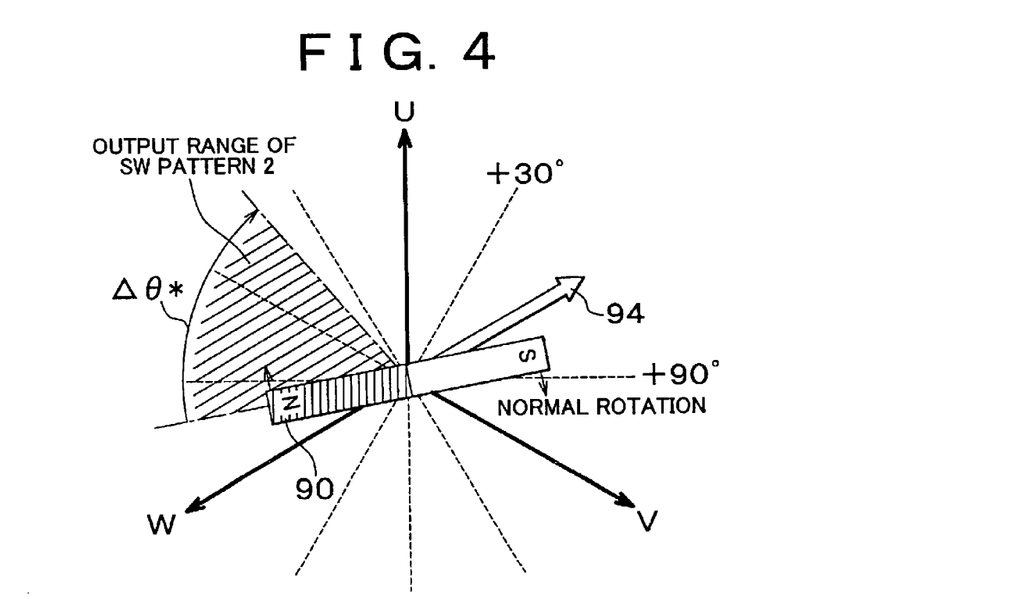
FIG. 4 is a schematic diagram illustrating an exemplary position of the rotor at the time of switching from the first SW pattern to the second SW pattern.

FIG. 4 is a schematic diagram illustrating an exemplary position of the rotor at the time of change from the first SW pattern to the second SW pattern. The rectangular wave generating unit 56 sets the SW pattern 2, which was determined as the next SW pattern in the initial control, as a current SW pattern. Now, the SW pattern 3 is determined as the next SW pattern as shown in FIG. 2.

In the second and subsequent switching controls, a value determined by the PI computing unit 58 based on the torque feedback control is used as a command value Δθ* of rotational angle of the rotor up to the timing of the switch from the present SW pattern to the next SW pattern. More specifically, the torque estimating unit 64 outputs an estimated torque based on the estimated electric power determined by the electric power computing unit 62 in relation to the previous SW pattern. Using the estimated torque, the PI computing unit 58 calculates a command value Δθ*. The value Δθ* is then transmitted to the rectangular wave generating unit 56, and is used for control with respect to the current SW pattern.

Furthermore, the rotation speed computing unit 60 calculates the angular velocity ω of the rotor based on the previous SW pattern. The angular velocity ω is also transmitted to the rectangular wave generating unit 56, and is used for control with respect to the current SW pattern. Using the value of the angular velocity ω, the rectangular wave generating unit 56 calculates a counter upper value N* according to the above-indicated equation (29), as in the control upon initial switching. The rectangular wave generating unit 56 then sets the upper value N* in the counter.

The rectangular wave generating unit 56 performs the above-described operation at the time of switching from the previous SW pattern to the current SW pattern, and outputs the SW signal corresponding to the current SW pattern to the inverter 54. In the second switching control, the SW signal corresponding to the SW pattern 2 is transmitted to the inverter 54, and a voltage vector 94 as shown in FIG. 4 is set in accordance with the rectangular wave voltage generated from the inverter 54. The rectangular wave generating unit 56 starts the counter simultaneously with the switching of the SW patterns. When the count value of the counter reaches the set upper limit value N*, the rectangular wave generating unit 56 proceeds to the operation of switching to the next SW pattern.

Thereafter, controls similar to the above-described control using the second SW pattern are performed. Accordingly, in these controls, driving of the AC motor 52 is controlled without requiring detection of the angular position of the rotor and without using a voltage phase command.

A limiter 68 is provided at a stage preceding the adder 66. A torque command value T* is transmitted to the adder 66 via the limiter 68. As described above in conjunction with the related art, the torque reaches a maximum when the angle formed between the electrical angle position of the rotor and the voltage vector representing the rectangular wave voltage applied to the stator windings is approximately equal to 90°. On the other hand, if the angle is larger than the upper limit angle (i.e., 90°), the torque decreases, and torque feedback control may not be accomplished. Thus, the torque deviation ΔT may fail to be equal to zero. In the drive control apparatus of the embodiment, therefore, the torque command value T* is restricted or limited by the limiter 68 to avoid a torque deviation corresponding to an angle range that exceeds the upper limit angle.

In the initial switching control as described above, the information regarding the voltage phase command and the electrical angle of the rotor obtained by the PWM control are used as initial values. If the apparatus is provided with such appropriate initial values as described above to start the rectangular wave voltage control, the AC motor 52 can be smoothly and quickly brought into a stable driving state. On the other hand, if a value determined with low accuracy is used as an initial value of the electrical angle of the rotor, or the like, it will take longer for the rectangular wave voltage control to drive the motor 52 with sufficient stability. However, a stable driving state will eventually be reached by the feedback control, and favorable driving control can be maintained afterwards.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A drive control apparatus for driving an AC motor by applying a rectangular wave voltage thereto, comprising:
    a torque estimating unit that obtains an estimated torque of a rotor of the AC motor;
    a torque deviation detecting unit that detects a torque deviation as a difference between the estimated torque and a torque command value representing a required torque of the AC motor; and
    a rectangular wave voltage controller that controls a state of the rectangular wave voltage applied to the AC motor, through torque feedback control based on the torque deviation, so that a torque of the rotor approaches the torque command value, thereby controlling the AC motor without the use of a rotor position sensor,
    wherein the rectangular wave voltage controller comprises:
    a rotation speed detector that detects a current rotation speed of the AC motor;
    a rectangular wave voltage phase switching unit that switches, in a predetermined order, a plurality of predetermined rectangular wave voltage states corresponding to different phase values of the rectangular wave voltage; and
    a switching timing controller that sets a switching timing of the rectangular wave voltage states to a timing that deviates from a reference timing determined based on the current rotation speed, by a length of time corresponding to the torque deviation.

2. A drive control apparatus according to claim 1, wherein the switching timing controller:
    determines an amount of rotation of the rotor during the current rectangular wave voltage state, according to the torque deviation; and
    calculates a time duration between switching to the current rectangular wave voltage state and switching to the next rectangular wave voltage state, based on a ratio of the amount of rotation of the rotor to the rotation speed.

3. A drive control apparatus according to claim 1, wherein the rectangular wave voltage controller switches the plurality of predetermined rectangular wave voltage states corresponding to different phase values of the rectangular wave voltage, in one of a first order in which the phase value increases, and a second order in which the phase value decreases.

4. A drive control apparatus according to claim 3, wherein the rectangular wave voltage controller selects one of the first order and the second order as a switching order of the rectangular wave voltage states, depending upon a rotating direction of the rotor.

5. A drive control apparatus according to claim 1, further comprising:
    an electric power estimating unit that obtains an estimated electric power of the AC motor based on a command value of the rectangular wave voltage applied to the AC motor, wherein
    the torque estimating unit obtains an estimated torque of a rotor of the AC motor, based on the estimated electric power.

6. A drive control apparatus according to claim 1, further comprising:
    a torque command value limiter that limits the torque command value within a range that permits the torque feedback control to bring the torque of the rotor close to the torque command value.

7. A drive control apparatus for driving an AC motor by applying a rectangular wave voltage thereto, comprising:
    a rectangular wave voltage controller that switches a plurality of predetermined rectangular wave voltage states corresponding to different phase values of the rectangular wave voltage, in one of a first order in which the phase value increases, and a second order in which the phase value decreases, thereby controlling the AC motor without the use of a rotor position sensor.

8. A drive control apparatus according to claim 7, wherein the rectangular wave voltage controller selects one of the first order and the second order as a switching order of the rectangular wave voltage states, depending upon a rotating direction of the rotor.

9. A drive control apparatus for driving an AC motor by applying a rectangular wave voltage thereto, comprising:
    a rectangular wave voltage controller that switches, in a predetermined order, a plurality of predetermined rectangular wave voltage states corresponding to different phase values of the rectangular wave voltage, thereby controlling the AC motor without the use of a rotor position sensor; and
    a rotating speed estimating unit that estimates a rotation speed of the AC motor, based on a time duration between switching to one of the rectangular wave voltage states and switching to the next rectangular wave voltage state, and a difference in the phase value between the switching rectangular wave voltage states.

10. A drive control method for driving an AC motor by applying a rectangular wave voltage thereto, comprising the steps of:
    estimating an estimated torque of a rotor of the AC motor;
    detecting a torque deviation as a difference between the estimated torque and a torque command value representing a required torque of the AC motor; and
    controlling a state of the rectangular wave voltage applied to the AC motor, through torque feedback control based on the torque deviation, so that a torque of the rotor approaches the torque command value, thereby controlling the AC motor without the use of a rotor position sensor,
    wherein the step of controlling the state of the rectangular wave voltage comprises the steps of:
    detecting a current rotation speed of the AC motor;
    switching, in a predetermined order, a plurality of predetermined rectangular wave voltage states corresponding to different phase values the rectangular wave voltage; and setting a switching timing of the rectangular wave voltage states to a timing that deviates from a reference timing determined based on the current rotation speed, by a length of time corresponding to the torque deviation.

11. A drive control method according to claim 10, wherein the step of setting a switching time of the rectangular wave voltage comprises:

determining an amount of rotation of the rotor during the current rectangular wave voltage state, according to the torque deviation; and calculating a time duration between switching to the current rectangular wave voltage state and switching to the next rectangular wave voltage state, based on a ratio of the amount of rotation of the rotor to the rotation speed.

12. A drive control method according to claim 10, wherein the step of switching the plurality of predetermined rectangular wave voltage states corresponding to different phase values of the rectangular wave voltage occurs in one of a first order in which the phase value increases, and a second order in which the phase value decreases.

13. A drive control method according to claim 12, wherein the step of controlling the state of the rectangular wave voltage comprises selecting one of the first order and the second order as a switching order of the rectangular wave voltage states, depending upon a rotating direction of the rotor.

14. A drive control method according to claim 10, further comprising the step of:

estimating an estimated electric power of the AC motor based on a command value of the rectangular wave voltage applied to the AC motor, wherein the estimated torque of the rotor of the AC motor is based on the estimated electric power.

15. A drive control method according to claim 10, further comprising the step of:

limiting the torque command value within a range that permits the torque feedback control to bring the torque of the rotor close to the torque command value.

* * * * *